(12) United States Patent
Pollutro et al.

(10) Patent No.: US 11,621,945 B2
(45) Date of Patent: Apr. 4, 2023

(54) METHOD AND SYSTEM FOR SECURE COMMUNICATIONS

(71) Applicant: SDSE Networks, Inc., Sterling, VA (US)

(72) Inventors: Dennis Vance Pollutro, Sinclairville, NY (US); Viji Bettadapura, Campbell, CA (US); Charles Illingworth, Herndon, VA (US); Saroop Mathur, Los Altos Hills, CA (US); John Zavgren, Wilton, NH (US)

(73) Assignee: SDSE NETWORKS, INC, Sterling, VA (US)

( * ) Notice: Subject to any disclaimer, the term of this patent is extended or adjusted under 35 U.S.C. 154(b) by 50 days.

(21) Appl. No.: 17/179,852

(22) Filed: Feb. 19, 2021

(65) Prior Publication Data

US 2021/0266303 A1 Aug. 26, 2021

Related U.S. Application Data

(60) Provisional application No. 62/979,711, filed on Feb. 21, 2020.

(51) Int. Cl.
*H04L 9/40* (2022.01)
*H04L 9/32* (2006.01)

(52) U.S. Cl.
CPC ........ *H04L 63/0435* (2013.01); *H04L 63/062* (2013.01); *H04L 63/067* (2013.01); *H04L 9/3268* (2013.01)

(58) Field of Classification Search
CPC . H04L 63/0435; H04L 63/062; H04L 63/067; H04L 9/3268
See application file for complete search history.

(56) References Cited

U.S. PATENT DOCUMENTS

2002/0136410 A1 9/2002 Hanna
2003/0026431 A1 2/2003 Hammersmith
(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) dated Jun. 9, 2021, by the International Application Division Korean Intellectual Property Office in corresponding International Application No. PCT/US2021/018647. (10 pages).

*Primary Examiner* — Techane Gergiso
(74) *Attorney, Agent, or Firm* — Panitch Schwarze Belisario & Nadel LLP

(57) ABSTRACT

A system/method for secure communication between client devices includes receiving a request, at a secure communication platform, from a from a first client device to communicate with a second client device; determining, by the secure communication platform, whether the first client device is permitted to communicate with the second client device; if communication is permitted: generating, by the secure communication platform, a one-time use ephemeral key; transmitting, by the secure communication platform, the generated one-time use ephemeral key to the first and second client devices; establishing, by the secure communication platform, a secure communication session directly between the first and second client devices, wherein communications between the first and second client devices are encrypted and decrypted using the one-time use ephemeral key; and destroying, by the secure communication platform, the one-time use ephemeral key upon termination of the secure communication session between the first and second client devices.

21 Claims, 8 Drawing Sheets

(56) References Cited

U.S. PATENT DOCUMENTS

| | | |
|---|---|---|
| 2005/0050328 A1* | 3/2005 | Mizrah ................ H04L 9/0844 |
| | | 713/171 |
| 2006/0093138 A1* | 5/2006 | Durand ................ H04L 9/0844 |
| | | 380/44 |
| 2012/0087495 A1 | 4/2012 | Revell |
| 2016/0124742 A1 | 5/2016 | Rangasamy et al. |
| 2017/0250811 A1* | 8/2017 | Edwards ............... H04L 9/0894 |
| 2017/0295226 A1* | 10/2017 | Basta ................... H04L 67/141 |
| 2019/0014094 A1* | 1/2019 | Le Saint ............. H04L 63/0428 |
| 2019/0020631 A1 | 1/2019 | Leavy et al. |
| 2019/0089532 A1* | 3/2019 | Lambert ................ H04W 8/24 |

\* cited by examiner

METHOD AND SYSTEM FOR SECURE COMMUNICATIONS

CROSS-REFERENCE TO RELATED APPLICATIONS

This application is related to and claims the benefit of priority to U.S. Provisional Patent Application No. 62/979,711, filed Feb. 21, 2020, the entire contents of which are incorporated herein by reference.

FIELD OF THE DISCLOSURE

The present disclosure is directed toward secure communications and, in particular, toward a cloud-based management service platform that enables rapid stand-up and teardown of doubly encrypted enclaves between two enabled endpoints (also referred to as client devices).

BACKGROUND OF THE DISCLOSURE

Internet communications have a vital impact on today's society, allowing individuals to have a wider range of communication and interactions. These range from sharing thoughts and experiences, to doing business online, completing financial transactions online, conducting Internet banking online, and sharing confidential and proprietary information and data online. With the proliferation of Internet communications and computer networks, there have arisen a growing number of unscrupulous individuals seeking to access such confidential information and data communications over computer networks. As such, security is a pressing concern to prevent the theft of confidential/personal information and data.

Secure communication is desired when two entities are communicating with one another and they do not want a third party to listen in or view data transmissions. Secure communications include means by which information and data can be shared with varying degrees of certainty that third parties cannot intercept what was transmitted.

As the speed at which Internet communications has increased, it has become increasingly difficult to provide the required level of security for such transactions using heavy traditional and manual processes and equipment such as, for example, Virtual Private Networks (VPN), VPN concentrators, binary/static key messaging systems, etc.

The disclosed system and method is directed toward overcoming one or more of the above-mentioned problems, though not necessarily limited to embodiments that do.

SUMMARY OF THE DISCLOSURE

The disclosed system and method is a result of the need to solve a gap in current technical capabilities, that gap being the desire to have systems that "automatically" connects endpoints (e.g., computers, phones, Internet of Things (IOT) devices, servers, cloud hosted services, cloud containers, etc.) using standard encryption (e.g., Advanced Encryption Standard (AES), SHAW BlueCurve Network Security, etc.) at the time of a communication or transaction (e.g., an Automatic Teller Machine (ATM) request and response for funds, a sensitive message between users, an online purchase, data exchanging between IOT devices, etc.) and be accomplished on any network of opportunity (any Internet Protocol (IP) network, e.g., a public Wireless Fidelity (WiFi) network, a private network, or any combination of public or private networks wired, wireless, or even satellite) all without heavy traditional and manual processes and equipment like a Virtual Private Network (VPN), VPN concentrators, and binary/static key messaging systems.

In telecommunications, switching between networks or communication links occurs via setup (AKA "standup") and teardown procedures. For instance, a first client device (e.g., smartphone) making a secure connection and exchanging sensitive information with a second client device (e.g., bank server, ATM, etc.) occurs via a standup and teardown procedure that establishes and severs communication links, respectively. As will be explained herein, the disclosed system/method allows for rapid standup and teardown of doubly encrypted enclaves between client devices (or endpoints) that can work on any network.

Conceptually, the disclosed system and method delivers the same result as if all devices that wanted to communicate for a particular transaction were physically plugged together with a network cable for only the time of the communication and only for the particular "application" that needs to communicate. Also, each device has a private/personal VPN inside the device, with policy (all VPNs have policy) for such communication, and each endpoint has a unique one-time "encryption key" only known by that endpoint that is used for "one" communication or transaction. Once the communication is completed, the "wires" are all removed, the key is destroyed (never to be used again) and the VPN is removed.

To accomplish the above would be nearly impossible with today's technology capabilities, as well as impractical for situations where many hundreds, thousands or even millions of transactions a day are required. However, the technology disclosed herein is necessary in today's highly transactional environment to reduce the "attack surface" so that an attacker would not have time to intercept the communication or transaction, as once completed it would no longer exist.

The system and method disclosed herein deliver this capability with less overhead, no physical hardware or network components, and with less manual labor, all built with pure software.

To eliminate the need to manipulate a particular software applications (meaning no need for an Application Programming Interface (API), Software Development Kit (SDK) or rewrite of the application required like with other "proxy system" like software defined perimeter tools, software defined network capabilities or zero trust networks), the system leverages the concept of a "software definable virtual network adaptor" referred to and documentation as an agent or client. The disclosed system and method provides for "any IP based application" to pass traffic natively.

The disclosed system and method leverages an ephemeral keying method/methods that, when triggered, generate one-time use keys that are then associated with the unique connection and/or session. Note, these one-time use keys change with each and every connection and/or session. Instead of being ephemerally generated one time like many other solutions, each key is destroyed and a new one is created every time a connection and/or session occurs—i.e., a new key is generated/destroyed with every standup/teardown.

The system includes a "platform" made up of an auto-scaling, self-healing, microservices that operate via a fully distributed architecture. The platform can live on a cloud, in a data center, on a virtual machine, or any combination thereof. The platform can also be used between microservices, as discussed later in this disclosure. The platform can be configured so that it is only used to "coordinate" all the information necessary to "set up" these one-time, ephemeral keyed, cryptographic private networks and then steps out of the data path. The platform is also the "coordinator" for all endpoint policy. The platform is made up of a host of API plugins that can interact with "traditional backend systems" to reuse or pull common information to set policy about each endpoint. The platform in many ways is the traffic cop. One key element to keep in mind is the speed at which these transactions need to occur and how many "one-time keys" need to be generated, yet still be more efficient that traditional network gear.

It is understood that it would be nearly impossible to manage keys at this rate using traditional methods, and that associations between those keys would be outrageous, also removing traditional network overhead such as hardware VPNs and VPN concentrators is a key to the success of the disclosed system and method. This disclosure describes how each of the components of the system operate, and how it is possible to accomplish this capability at a scale necessary to meet today and future demands; not just in a lab.

Today, many application that are built using "containers" and using orchestration technology like Kubernetes lacking the ability to leverage strong (mutual authenticated and keyed) connection between the containers that make up the application, especially those that were written over the last several years to meet the demand of "cloud computing". Yet, the disclosed system and method, because of its adaptability and independence of hardware and traditional methods, can also be applied to protect "intra connections" between containers within a cloud (docker/Kubernetes) based application without the need to "rewrite or interface with an API", meaning it will work with already developed applications or ones being currently built.

Much like the disclosed system and method does for an endpoint, server or service, it can also provide for "intra container" communication, thus providing, mutually keyed, point to point (container to container), encrypted connections based on a software defined virtual adapters that used ephemeral one-time use keys.

With the system and method disclosed herein, rather than an agent being deployed to an endpoint, a "side car" (common method for software add-ons in cloud computing) mechanism is used, and defined by the cloud host provider as a service that can be consumed by anyone hosting applications on the cloud provider's network. The ease of implementation make it such that only a reference to, and a definition change (e.g., only a few lines of code) within its Kubernetes orchestration, is necessary for the entire cloud application to use the transactional two way ephemeral keyed encryption between its containers. Unlike conventional "micro-segmentation products" that require tremendous rewire as well as management of an entire micro segmentation system, this capability becomes native to the cloud host fabric and is inherited by any who use it.

In one embodiment, a method is provided for secure communication between client devices. The method includes receiving a request, at a secure communication platform, from a from a first client device to communicate with a second client device; determining, by the secure communication platform, whether the first client device is permitted to communicate with the second client device; if communication is permitted: generating, by the individual client devices, a one-time use ephemeral key; transmitting, by the secure communication platform, the generated one-time use ephemeral keys to the first and second client devices; establishing, by the secure communication platform, a secure communication session directly between the first and second client devices, wherein communications between the first and second client devices are encrypted and decrypted using the connection specific one-time use ephemeral keys of each device; and destroying, by the endpoint device, the one-time use ephemeral key upon termination of the secure communication session between the first and second client devices.

In one form, the method further includes generating, by the client devices, a new one-time use ephemeral key pair for each subsequent secure communication session between the first and second client devices. The subsequent ephemeral public keys of each connection-specific pair will be transmitted and authenticated via the secure communication platform.

In one form, the one-time use ephemeral key includes a public-private key pair.

In one form, the method further includes: receiving, by the secure communication platform, control session information from the first and second client devices; and determining, by the secure communication platform, termination of the secure communication session using the received control session information.

In one form, the method further includes denying, by the secure communication platform, the request by the first client device if it is determined that communication is not permitted.

In another embodiment, a system is provided for secure communication between client devices. The system includes a secure communication platform including a processing server configured to: receive a request from a from a first client device to communicate with a second client device; determine whether the first client device is permitted to communicate with the second client device; if communication is permitted: generate a one-time use ephemeral key; transmit the generated one-time use ephemeral key to the first and second client devices; establish a secure communication session directly between the first and second client devices, wherein communications between the first and second client devices are encrypted and decrypted using the one-time use ephemeral key; and destroy the one-time use ephemeral key upon termination of the secure communication session between the first and second client devices.

In one form, the processing server is further configured to direct the client devices to generate a new one-time use ephemeral key for each subsequent secure communication session between the first and second client devices.

In one form, the one-time use ephemeral key comprises a public-private key pair.

In one form, the processing server is further configured to: receive control session information from the first and second client devices; and determine termination of the secure communication session using the received control session information.

In one form, the processing server is further configured to deny the request by the first client device if it is determined that communication is not permitted.

Additional features, aspects, objects, advantages, and possible applications of the disclosed system and method will become apparent from a study of the exemplary embodiments and examples described below, in combination with the Figures and the appended claims.

BRIEF DESCRIPTION OF THE FIGURES

The above and other objects, aspects, features, advantages, and possible applications of the present disclosure will be more apparent from the following more particular description thereof, presented in conjunction with the following drawings. It should be understood that like reference numbers used in the drawings may identify like components.

DETAILED DESCRIPTION

The following description is of an embodiment presently contemplated for carrying out the systems and methods disclosed herein. This description is not to be taken in a limiting sense but is made merely for the purpose of describing the general principles and features. The scope should be determined with reference to the claims.

Figure 1:
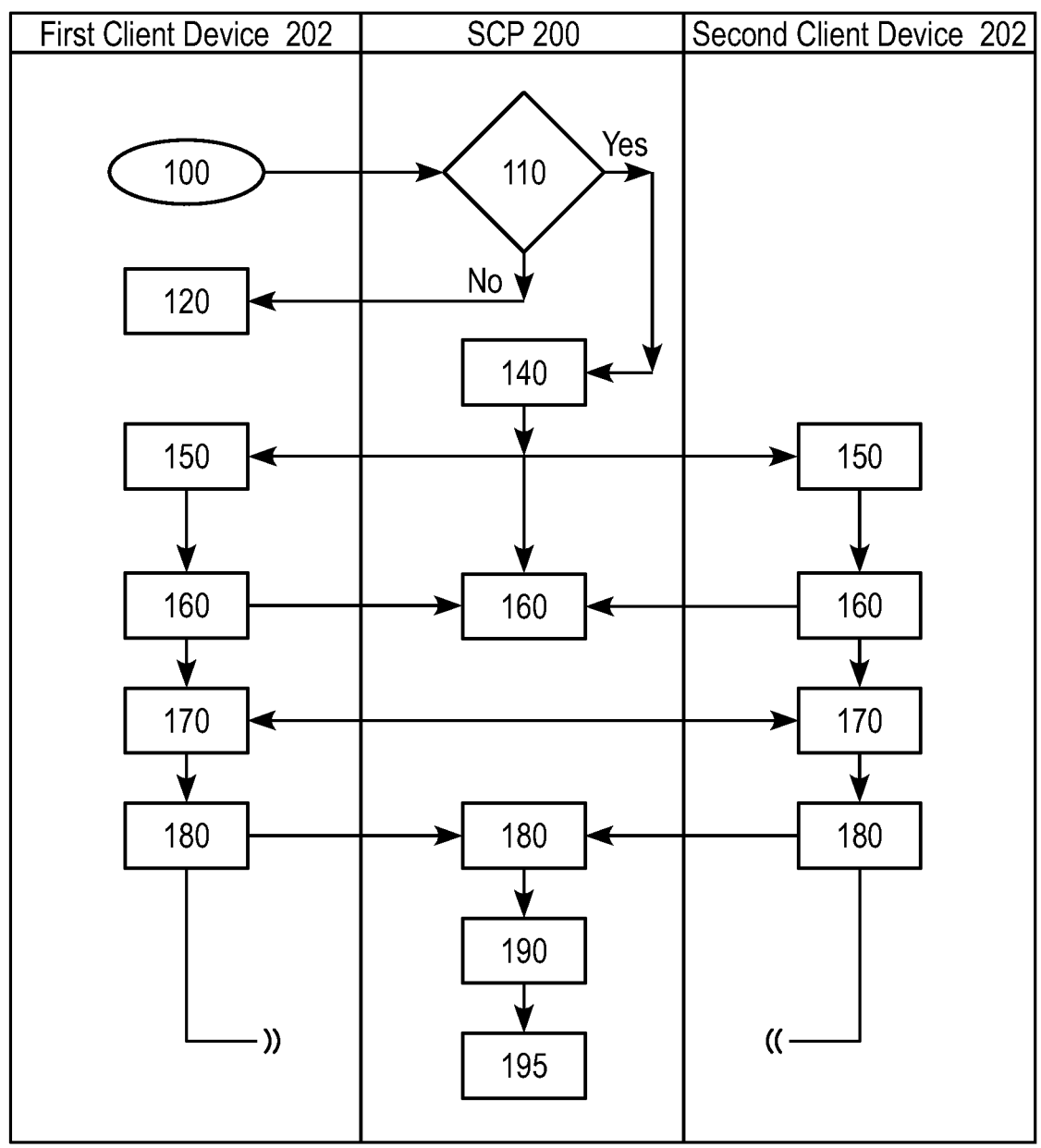
FIG. 1 is a swimlane flow diagram illustrating interaction between the first and second clients and the secure communication platform for establishing a secure communication session.
Figure 2:
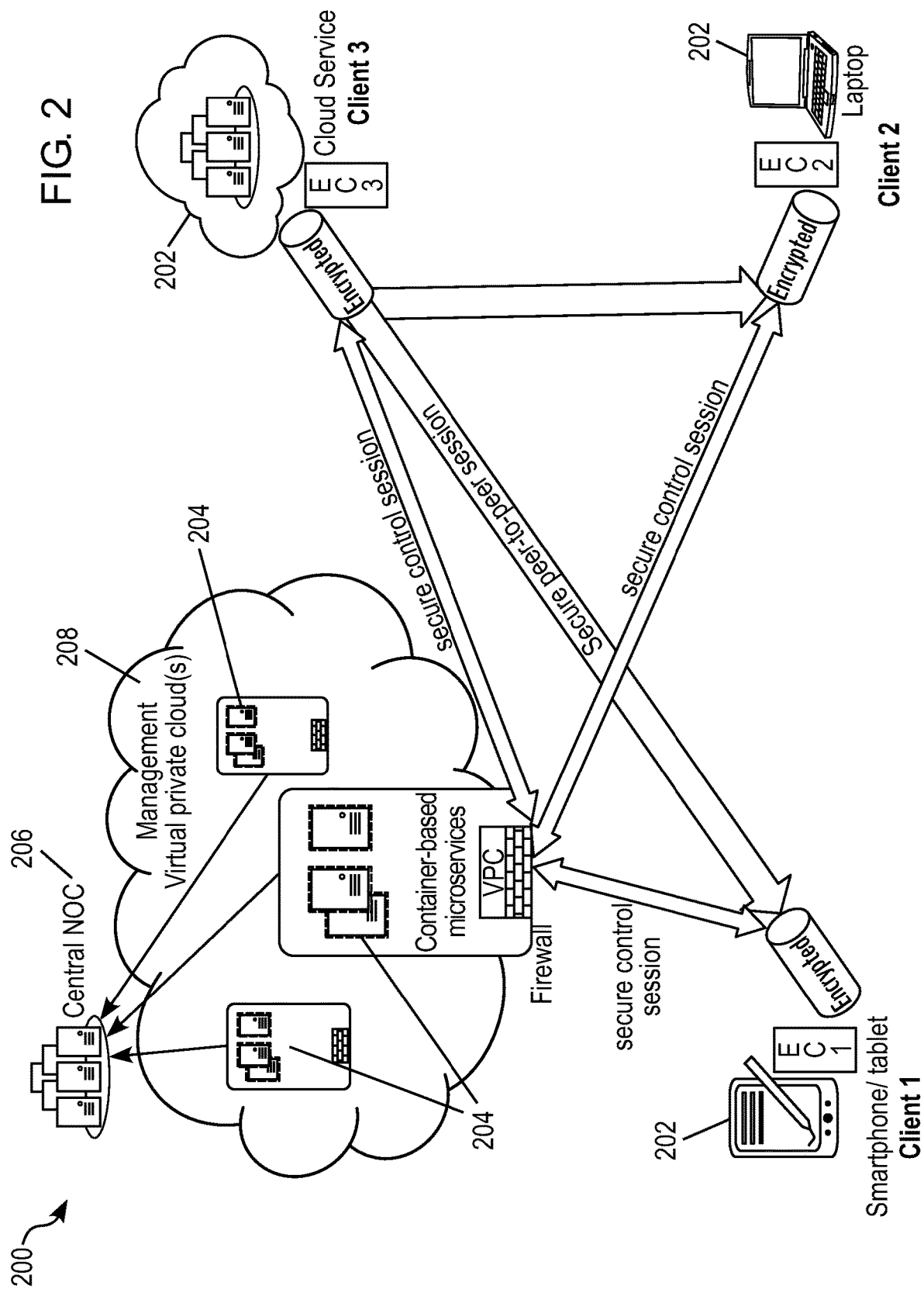
FIG. 2 shows an exemplary secure communication platform architecture.

Referring to FIGS. 1-2, a system and method are disclosed for secure communication between enabled endpoints (also referred to as client devices 202). The secure communication platform 200 (SPC) includes an elastic cloud-based eco-system of highly available geographically distributed services that work together to provision, enable, and set-up secure communication paths (also called enclaves) between any pair of enabled endpoints (client devices) anywhere on the Internet.

As shown in the swimlane flowchart of FIG. 1, a first client device 202 transmits a request to the secure communication platform 200 to communicate with a second client device 202 (at 100). The secure communication platform (SCP) 200 receives the request and determines whether the first client device 202 is authorized or permitted to communicate with the second client device 202 (at 110). If communication is not permitted, the secure communication platform 200 sends a notice back to the first client device 202 that the request was denied (at 120). If communication is permitted, the secure communication platform 200 directs the endpoints to generate one-time use ephemeral keys (at 140), and transmits the generated and authenticated one-time use ephemeral keys to the first and second client devices 202 (at 150).

The secure communication platform 200 delivers connection parameters for the establishment of a secure communication session between the first and second client devices 202 (at 160). After establishment of direct communication, the secure communication platform 200 is removed from the secure communication session, such that the secure communication session is directly between the first and second client devices 202 (at 170). Communications between the first and second client devices 202 are encrypted and decrypted using the one-time use ephemeral key.

Separate from the secure communication session, the first and second client devices 202 transmit control session information to the secure communication platform 200 (at 180). The secure communication platform 200 determines when a termination of the secure communication session occurs using the received control session information (at 190). Once it is determined that the secure communication is terminated, the one-time use ephemeral key is invalidated by the secure communication platform 200 and all traffic between the first and second client devices 202 ceases (at 195).

Once the one-time use ephemeral key is destroyed, it is not used again. A new one-time use ephemeral key is generated for each subsequent secure communication session between the first and second client devices 202. As will be explained herein, the one-time use ephemeral key may include a public-private key pair.

Enabled endpoints (e.g., client devices 202) can initiate secure communications on-demand, with the resulting encrypted communication routing directly between the two communicating endpoints with no broker or other infrastructure inserted between the client devices 202. With the disclosed system, a communication functions as though the two endpoints are directly connected via a virtual Network connection. Endpoint authentication and enclave communication require mutual digital certificate verification. Further, each time an enclave communication is initiated, an ephemeral certificate is issued for the communication that is valid only for the duration of the communication. Policy (a set of protocols defining guidelines for access) is defined for each endpoint, which determines which communication is permitted between an endpoint(s) and another endpoint, service, or device. Policy also determines connection information that is specific to enclave creation with the endpoint(s).

The management infrastructure (e.g., the secure communication platform 200) is responsible for validating endpoints/endpoint policies, applying group and device policy, and initiating enclave creation. The management infrastructure can be deployed as a Virtual Private Cloud (VPC) 208. The VPC 208 can include a container-based microservices 204 architecture, enabling on-demand elastic scalability and API-enabled management. Intra-service communications between Docker containers require mutual certificate exchange and are encrypted.

Ephemeral certificates are short lived certificates that are used by applications for the purpose of proving their identity across a network and to reduce the window of vulnerability of their private keys. Each client device 202 is automated to request a new certificate for each new session (control session with the secure communication platform 200, or secure enclave connection with a peer client device 202). The secure communication platform 200, after the required validation, generates a new certificate for the next session with the client device 202. Thus, there is no administrator overhead to manage and maintain each client's keys, certificates or Certificate Revocation Lists (CRL). Instead, the system manages the regeneration of new certificates and revocation of the old ones, as needed.

When a client device 202 requests the secure communication platform 200 to create a new enclave session with a peer client device 202, the secure communication platform 200 provides information about the peer client device 202 (including connectivity details) that the client device 202 can use to create a secure enclave session with the peer client device 202. It should be noted that the secure communication platform 200 does this even if the client device 202 and/or peer client device 202 is/are behind Network Address Translation (NAT) firewall(s). Each client device 202 maintains a control session with the secure communication platform 200. Once the enclave is active, there is no third-party in the middle that can act as a proxy between the two client devices 202 because the control sessions that each client device 202 has with the secure communication platform 200 uses a different set of credentials and has no inroads into the enclave session between the two client devices 202. The control sessions are needed only to exchange periodic status updates.

The system manages communications of each client device 202 by using Client Groups definitions and Policies definitions via management API. These Client Groups and Policies can be defined globally, as well as per group or individual client device 202. These are used by the system to determine if a client device 202 can communicate with a peer client device 202. These are also used to determine which traffic between client devices 202 should be encrypted. For instance, the type of application and/or the final destination of traffic can be used to determine if the traffic should be encrypted.

Figure 4:
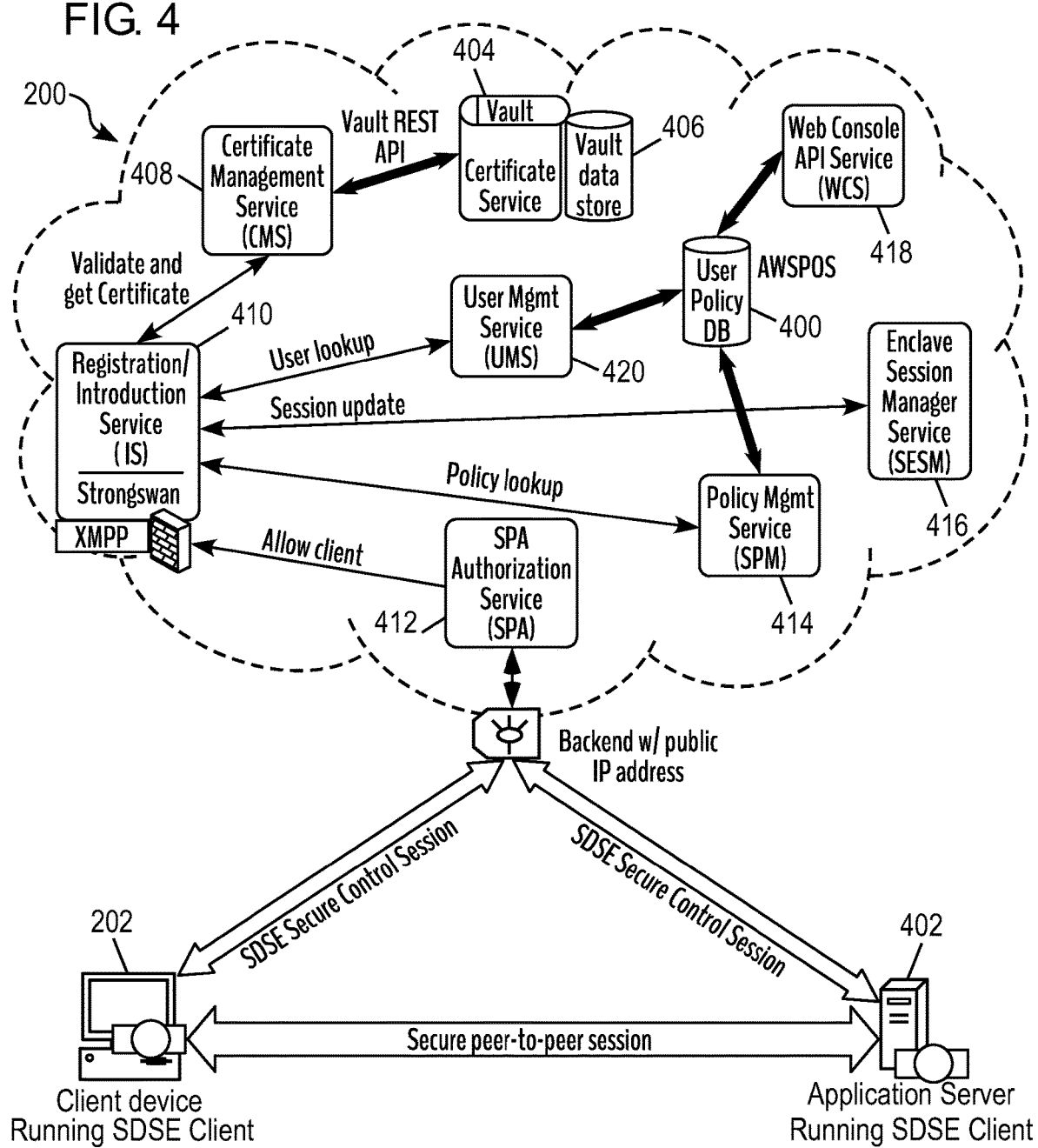
FIG. 4 shows another exemplary secure communication platform architecture.

Some embodiments include the use of Single Packet Authorization (SPA) 412 (see FIG. 4). SPA is a unique security technique that makes a system's cloud service invisible except to authorized client devices 202. SPA 412 is an optional feature that can be used with the system—e.g., SPA 412 can be an optional security layer. SPA 412 verifies the authenticity of client devices 202 before they may connect to their unique cloud service. SPA 412 can simultaneously and silently deny access to unauthorized client devices 202 via a dynamic firewall. After a client device 202 is authorized by SPA 412, the dynamic firewall allows connections from the authenticated client device 202 so that the protected end-points can connect to an Original Equipment Manufacturer (OEM) services and infrastructure. The dynamic firewall makes a cloud service invisible and unresponsive to port scanners. It should be noted that because SPA 412 messages can be processed faster than they can be generated and transported by client devices 202 and adversaries alike, these invisible secure communication platform 200 entry points are invulnerable to all Distributed Denial of Service (DDoS) attacks.

The system can be integrated into an OEM partner's infrastructure by means of API's that hook into the secure communication platform 200 and client device 202 software. The system provides a management API to be used by OEM partners to provision the secure communication platform 200, users/groups, and policies across multiple domains. These APIs can also be used to integrate provisioning of the system into a partner's administration/web management console. In addition, the APIs can allow for customizing specific components.

Figure 3:
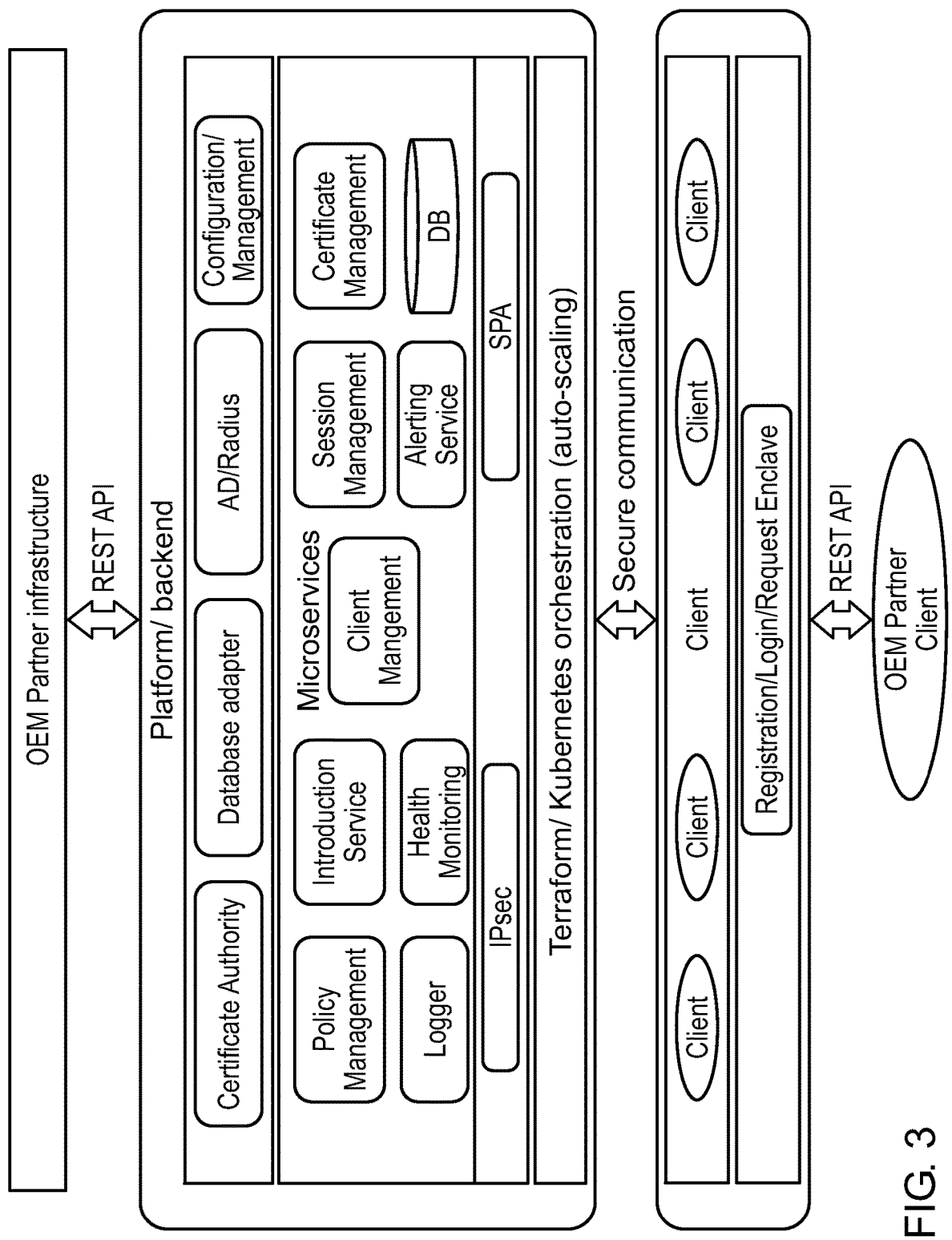
FIG. 3 shows a block diagram of an embodiment of the secure communication platform with microservices residing in an Original Equipment Manufacturer cloud or data center infrastructure.

Referring to FIG. 3, an embodiment of the secure communication platform 200 includes microservices 204 (an architecture that arranges an application as a collection of loosely coupled services) that reside in the cloud (public, private or on premises). It can be deployed inside an OEM partner's cloud or data center infrastructure. The secure communication platform 200 can include the following features:

1. Docker/Microservices 204 based architecture.
2. Auto-scaling and Load-Balancing.
3. Logging and alerting system.
4. Health Monitoring.
5. API Gateway.
6. Connection to a Network Operation Center (NOC) 206.
7. Platform Perimeter Security (e.g., SPA 412).
8. Support for Multi-Tenancy.

In an exemplary embodiment, system functionality is implemented as stateless (does not save client device 202 data generated in one session for use in the next session with that client device 202) microservices 204 running in Docker-based containers. The microservices 204 are not publicly accessible, and communicate with each other over end-to-end secure links, using certificates to authenticate and exchange messages. All microservices 204 work together by communicating with each other using a message-queue service (e.g., Amazon Web Service Simple Queue Service (AWS SQS)). Messages between microservices 204 are mutually authenticated and encrypted using system generated certificates uniquely identifying each microservice 204. This provides end-to-end security between the microservices 204 and does not rely on the cloud-provider-managed keys.

A Certificate Management Service (CMS) 408 can be used for generating and managing certificates for the client devices 202 and platform microservices 204. The CMS 408 can use the security barrier services of Vault 404 to sign and generate certificates for authorized client devices 202 and microservices 204. The CMS 408 can be configured to use a self-signed Certificate Authority (CA) by default, but can also be configured via API to use a third-party Certificate Authority by its OEM partner. Separate intermediate CA's can be used to sign certificates for the clients and microservices 204.

Referring to FIG. 4, in some embodiments, an Introduction Service (IS) 410 can be used to manage all communications with the client devices 202 for registration, login/logout, enclave requests, and periodic status updates. The Secure Communications Platform (200) validates a client device 202 before allowing it to establish a secure session with the secure communication platform 200, for client device 202 registration or client device 202 login. The IS 410 can achieve this by communicating with a User Management Service (UMS). The UMS manages users and groups. The IS 410 is responsible for registration of authorized client devices 202 when details unique to the client device 202, such as a password and device-specific information, is captured and stored in the user-database 400 of the secure communication platform 200. Subsequent requests to login are validated against these stored values for device-specific details. The IS 410 acts as an intermediary to obtain client device 202 policies and group members, as well as update client device 202 registration details in the secure communication platform's 200 datastore.

The IS 410 is also responsible to act as the intermediary when a client device 202 initiates a request for an enclave with a peer client device 202. The IS 410 checks if the client device 202 is permitted to communicate with the requested peer client device 202, and, if allowed, provides each end of the connection with credentials and connectivity details that allow them to set up a secure enclave, even if one or both of the client devices 202 are behind NAT firewalls and are not publicly reachable. The IS 410 also handles periodic status updates from client devices 202 about their enclave activity status as long as the client devices 202 stay logged in.

In some embodiments, a UMS 420 can be used for managing clients and groups. The primary responsibility of UMS 420 can be to handle requests from the IS 410 if a client device 202 is valid or to retrieve group members of a client device 202 to determine if a client device 202 is allowed to communicate with its requested peer client device 202. It also updates user-info in the database 400 on behalf of the IS 410. The UMS 420 uses Structured Query Language (SQL) queries to read/write client information from/to the database 400.

The secure communication platform 200 allows definition of policies that are one of three types:
1. Global Policies—common to the system, applies to all client devices 202.
2. Group/User policies—apply to a group of client devices 202, can be overridden for a specific user.
3. User Policies—Apply to a user (client device 202).

Each of these policies are relevant to one or more microservices 204, depending on their function.

In some embodiments, a Policy Management Service (SPM) 414 can be used for computing and retrieving policies that are applicable to a client device 202 or to a service based on its group membership and configured policy overrides, if any. It also provides policies that apply to each microservice 204 upon startup and whenever the policies are updated by a management administrator.

As noted herein, each client device 202 connects to the secure communication platform 200 using a control session and with each of its peer client devices 202 using an enclave session. In some embodiments, a Session/Enclave Management Service (SESM) 416 can be used for managing and monitoring all control and enclave sessions that are active at any given time. For instance, the SESM 416 can be configured to generate a unique session id when a new control or enclave session is created by the IS for a client device 202. It can also be configured to remove sessions that are inactive or torn down as reported by the IS 410.

In exemplary embodiments, a Web Console Service (WCS) 418 can be used for providing Representational State Transfer (REST) API to provision/configure the secure communication platform 200 with client users/groups/policies once it has been deployed. The WCS 418 allows Role-Based Access Control (RBAC) to administer the secure communication platform 200 and policies. Depending on the administrator's role (SuperAdmin or DomainAdmin), the administrator is allowed to manage the entire secure communication platform 200 or any one or combination of its domains. The WCS 418 can be configured to validate data passed through management APIs and store it in a Postgres database.

The microservices 204 that run as Docker containers are auto-scaled and load-balanced using Kubernetes (e.g., AWS Elastic Kubernetes Service (EKS)) in one or more VPC 208, based on the number of client devices 202 registered and the number of active enclave sessions at any given time.

The Load-Balancing Functionality:
1. Distributes client device 202 requests, or network load, efficiently across multiple clusters.
2. Ensures high availability and reliability by sending requests only to instances that are online.
3. Provides flexibility to automatically add or subtract services as demand dictates.

Auto-Scaling Functionality:
1. Ensures that the user/policy database 400 is automatically scaled and requests are load-balanced.
2. Ensures that the certificate datastore is scaled and is accessible to all CMS 408 services that are coupled with Vault 404 functionality.
3. Ensures that Ejabberd (a chat server that can service a larger number of users than IS can) is scaled at a different rate than IS and its services are made available to each IS service instance.

All microservices 204 log their activity both at system and application (client/session activity) level. The centralized logging service is responsible for collating logs from all services and storing them for later log-viewing and alerting.

Examples of logs can include:
Activity logs (logged by IS, SESM 416):
Client login/logout events.
Client enclave creation/tear-down.
Client request denied due to invalid certificate or invalid password etc.
Admin logs in.
Configuration logs (logged by WCS 418):
Policy changes (by which admin).
Groups/users addition/deletion/change.
Admins addition/deletion infrastructure logs (logged by orchestration service (e.g., Kubernetes)).
A new microservice 204 start (to handle increased incoming requests or to replace an existing non-responsive one).
An IS service start in a new region.
A new cluster being added.
Security logs (logged by IS 410, CMS 408):
Security group (ACL) modified by Admin.
Successful/unsuccessful login by user.
Password change affected by users.
Certificate expiry/renewal for users.
New certificate generated/revoked for user/microservice 204.

Each microservice 204 is required to report its health at regular intervals to the Kubernetes engine that ensures high-availability in a load-balanced manner.

Figure 5:
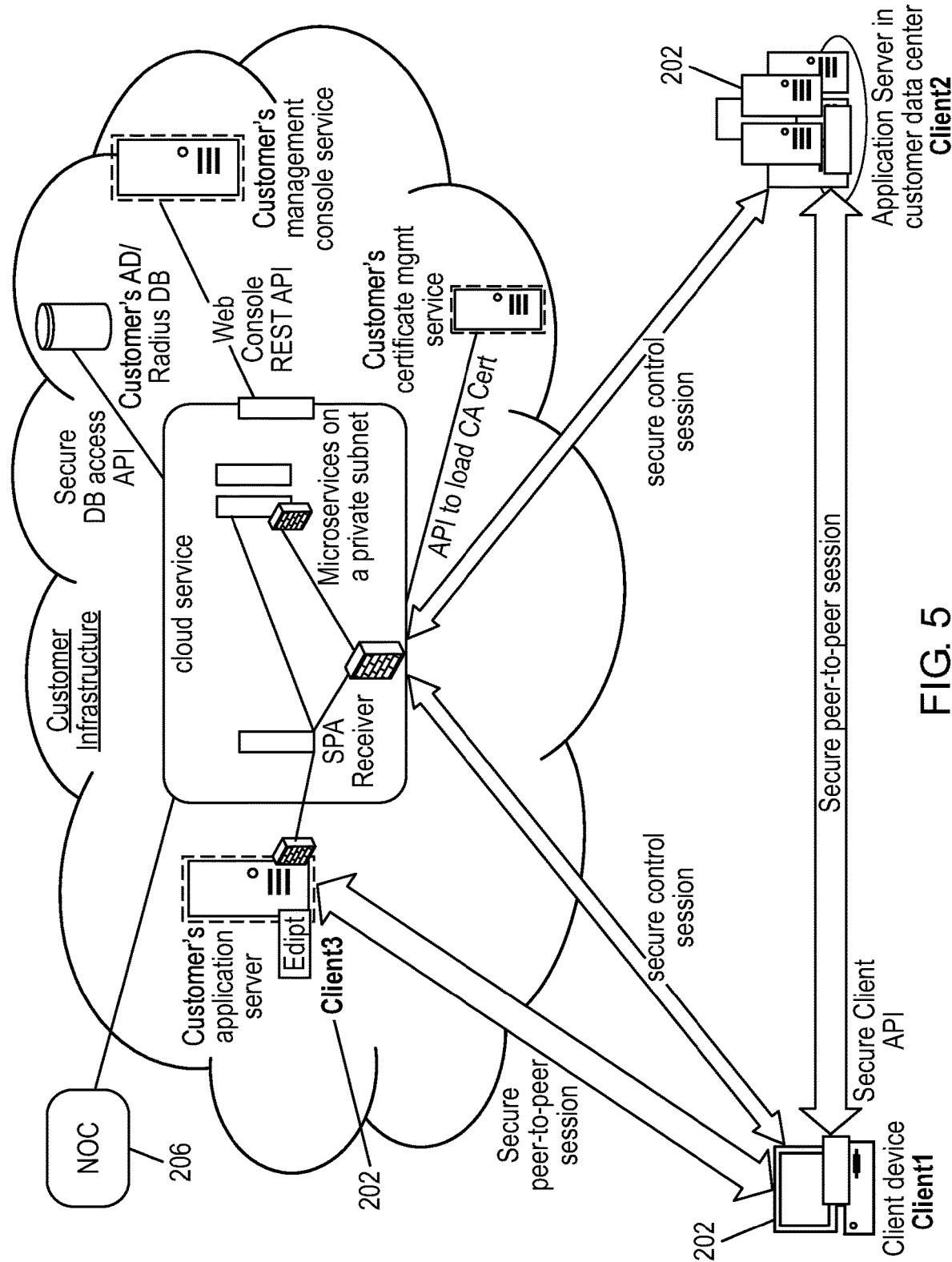
FIG. 5 shows another exemplary secure communication platform architecture.

Referring to FIG. 5, the secure communication platform 200 can include an API gateway that allows an OEM partner to make API calls into the secure communication platform 200. The API calls are routed through the respective microservices 204 to facilitate any needed changes (ex: adapter to route SQL queries to the partner's database). The cloud service integrates into the OEM Partner's infrastructure by providing APIs to:
1. Provision and manage users (ex: Active Directory) using partner's User Management system.
2. Provision and manage policies for groups/endpoints, using partner's database.
3. Import a root CA for CMS 408.
4. Provision and manage keys.
5. Log session and enclave activity into the customer's auditing system.

If the OEM partner's solution includes client software that already runs on each end-point device, it is possible to incorporate functionality into the partner's client (assuming there are no physical constraints) by making calls to the client-provided API. As an example, the client device 202 registration can be executed as part of the partner's client's registration process. Agent devices 402 will provide APIs to:
1. Integrate into the OEM partner's own client-software, if any.
2. Integrate into the OEM partner's client installer.
3. Integrate with a centralized deployment system or create drop-in installations.
4. Log client activity into a central client audit log.

Each deployed secure communication platform 200 can be configured to optionally connect into a centrally managed NOC 206. This can be achieved via a unique Customer ID. The secure communication platform 200 can then report telemetry data and continual health status to the NOC 206. The NOC 206 uses this data to monitor all deployments to ensure that any health parameters stay within thresholds and aberrations are alerted to administrators by email/messages and handled pro-actively.

As noted herein, it is contemplated for the secure communication platform's 200 core microservices 204 to be not publicly reachable and to reside within VPC's 208 in one or more regions. The secure communication platform 200 is accessible using one or more public IP addresses/ports using REST API or over IPsec sessions from the clients. An agent device 402 communicates with the management service over IPsec. The management service authenticates communicating end-points, and establishes the peer-to-peer encrypted communication, removing the management service from the client device 202 to client device 202 (or peer-to-peer (P2P)) communication path. The control session monitors session activity to monitor when the secure communication completes. The enabled applications on peer client devices 202 use the encrypted enclave, via IPsec, to communicate with each other.

The following exemplary steps can be implemented to facilitate a client device 202 communicating a peer client device 202 via the system:

1. A client device 202 is added as a client/user in the user-database 400.
2. A custom client package encrypted with a unique passphrase, specifically generated for the client device 202, is installed on the client device 202. This can be done manually or using an automated central deployment system. The passphrase is needed to decrypt the package.
3. The system ensures that the client package includes one-time ephemeral credentials for registration. This may be achieved by using SPA 412 followed by IPsec.
4. The agent device 402 first registers with the cloud service, wherein a unique password is generated for additional security for a user-managed device.
5. The cloud service issues ephemeral credentials to the agent device 402.
6. The agent/client connects to the backend using the credentials.
7. The system requests a new set of credentials for the next session and stores it in memory.
8. If the agent device's 402 credentials username match, the client device 202 is allowed to login to the agent device 402.
9. A logged in service agent (ex: an ATM machine) runs any of the enabled applications that will automatically initiate or use an existing enclave. Each new enclave uses a new set of enclave credentials to connect with the peer agent (ex: Server), as long as the peer is also online (logged in).
10. The agent and peer are both enabled by the management service to reach each other directly, even if behind a NAT device.
11. When a client device 202 logs out, all its connections with peer client devices 202 are torn down.
12. The agent devices 402 can be set by policy to stay connected to the server at all times, renewing its ephemeral certificates periodically (based on policy), or can initiate a connection to the server whenever there is a requirement to communicate with a peer, or any other timing necessary to meet the specific requirement of the deployment.
13. The agent device 402 uses a new certificate for mutual authentication every time it connects with the cloud service, or with a peer agent device 402, and in each case, the agent device 402 will request an ephemeral certificate.
14. The agent device 402 generates a public private key pair. For peer-to-peer enclaves, these keys may be held in process memory. There is no need to write them to persistent storage where they may be read by adversaries or malware, because they are ephemeral.
15. The client device 202 generates an X.509 Certificate Signing Request (CSR) that contains an appropriate subject field.
16. The client device 202 sends the CSR message to the cloud service (along with other objects relevant to the session).
17. The CMS 408, operating within the cloud service, receives the CSR message, reads the subject field in the CSR and submits it to the appropriate intermediate CA for signing. The CMS 408 sends an ephemeral one-time-use certificate back to the client device 202, and the agent device 402 receives the certificate object and it is now ready for use.

Short certificate lifetimes reduce the time window of vulnerability for a client device 202 and/or the session communication through compromise of the certificate. For instance, short certificate lifetimes provide "Perfect Forward Authentication" in the sense that a compromised client device 202 cannot join the agent device 402 because its private key may be used only once for authentication.

Figure 6:
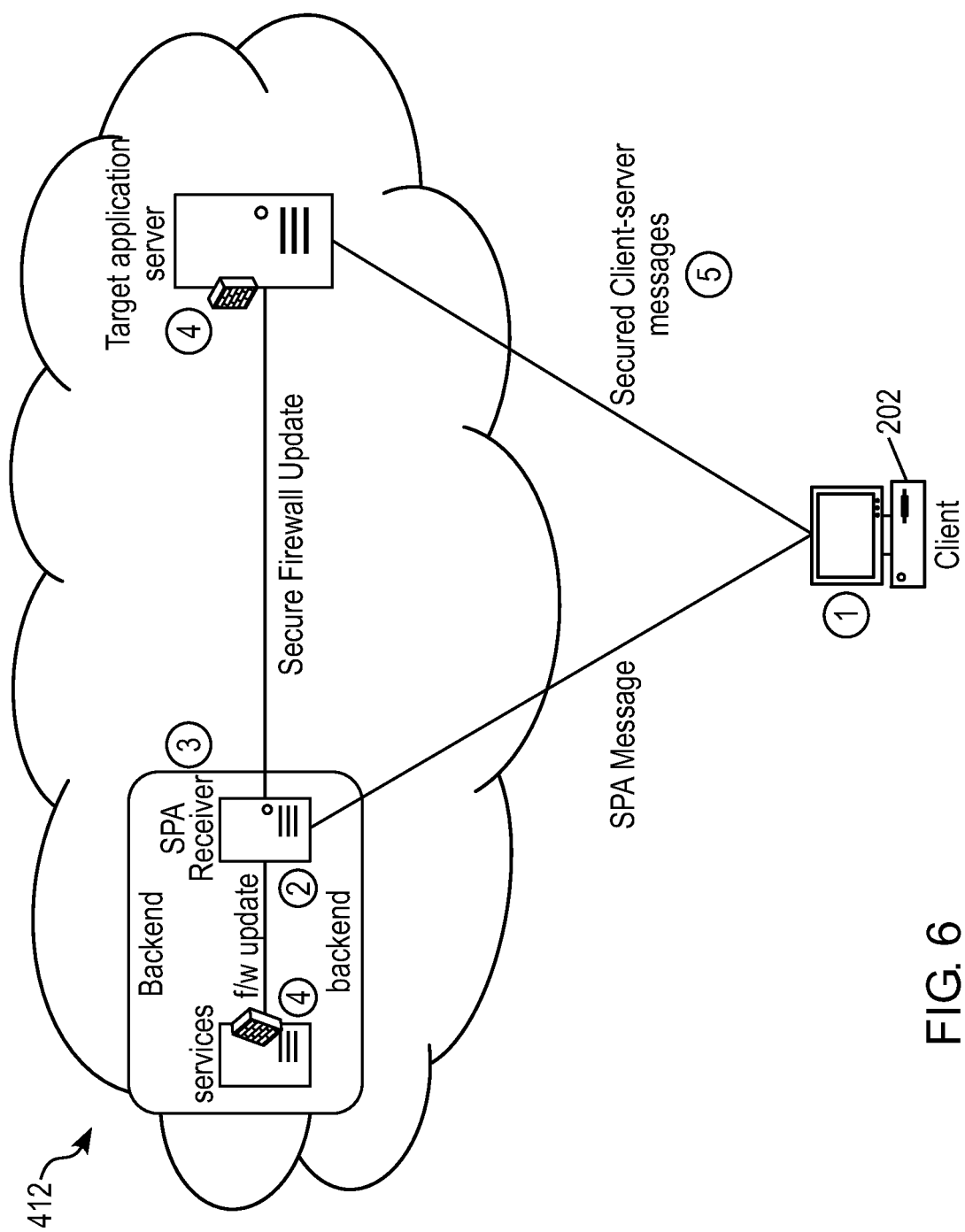
FIG. 6 shows an exemplary Single Packet Authorization architecture that may be used with the system.

Referring to FIG. 6, the SPA 412 (if used) will ensure that the secure communication platform 200 accepts requests only from client devices 202 that have a valid SPA 412 key provisioned by the secure communication platform 200. These SPA 412 keys are assigned ephemerally for every new session with the management service, thereby eliminating the key being used by an unauthorized end-point device. The following benefits can be realized with the use of SPA 412:

1. The cloud services and/or OEM partner application servers running the agent device 402 are invisible to unauthorized client devices 202 and adversaries alike—all open ports are protected by a dynamic firewall that blocks all unauthorized network access.
2. Client authorization is verified with a single SPA 412 datagram transmission. There is no connection, acknowledgement, or any form of feedback whatsoever.
3. All SPA 412 messages are processed (e.g., processed in the Linux kernel) faster than at network speeds. SPA 412 messages contain Bitcoin-style "Proof of Work" that makes the act of forgery arbitrarily expensive, and digital signatures that require access to a client-specific secret key. They also contain time stamps and Globally Unique Identifiers (GUIDs) that make replay attacks impossible. Any forged or replayed SPA 412 messages transmitted by adversaries are detected on the basis of: a) time stamp; b) nonce; c) Proof-Of-Work; and d) a digital signature. If an adversary were to replay a captured SPA 412 message, it would need to replay the packet before it expired, and even then, the GUID from the previous transmission is used to filter replays. These attacks are ineffective and logged for possible mitigation.
4. A client-specific firewall rule is installed at the backend (target server) after authorization. Adversaries (who have different IP flow characteristics) will always be silently blocked, thus maintaining invisibility.

The following are exemplary process steps to be used for operation of an SPA 412 within the system:

1. The client device 202 generates and transmits a SPA 412 message that contains six fields:
    i. SPA 412 version number;
    ii. a time stamp;
    iii. a GUID;

iv. padding;
v. Proof-of-Work (POW); and
vi. the Rivest, Shamir, and Adleman (RSA) signature of the client device 202.

2. The SPA 412 receives the message and filters it on the basis of these fields. Illegitimate messages that are stale (or a causal), show insufficient work, or have invalid signatures, etc., are discarded without any feedback. This filtering occurs in the Linux kernel at a rate that is guaranteed to exceed the rate that any adversary can create and transport any bogus SPA 412 messages. Also, bogus messages are logged for forensic analysis.
3. When a legitimate SPA 412 message is received, the SPA 412 creates a flow-specific firewall rule that will provide access to the backend to the authorized client device 202. Firewall rules are also created that provide access to approved application servers.
4. The dynamic firewalls are updated with the new rules that are communicated with end-to-end encryption.
5. The authorized client device XX connects to the backend and the application servers via the installed firewall rules, and authenticates itself with ephemeral certificates. SPA 412 operates at the IP network layer, whereas authentication operates at the session layer.

A single secure communication platform 200 can support multiple tenants. But the clusters of microservices 204, datastore, certificate issuing authority, and domain names are separately maintained so that there is no overlap of control data nor enclave session traffic between any two tenants. The secure communication platform 200 can be deployed using Kubernetes/Terraform. Kubernetes orchestration of all microservices 204 may be provisioned by Terraform.

The secure communication platform 200 deployment is optimized for the needs of each OEM partner. The important factors that are to be considered and fed into the deployment engine are:

1. Regions and cloud-providers (e.g., AWS) made available for the secure communication platform 200, which can be based on density of end-user devices.
2. Mechanism for downloading the client packages (ex: Client app store, One-time web-link, manual deployment of other).
3. Partner component definitions-ex: Root CA certificates, database credentials, cloud-provider credentials, Active Directory access credentials.
4. Scalability factors (maximum number of simultaneous client devices 202 by region, thresholds for deploying new services (ex: minimum acceptable sessions/sec).
5. Ports to be used for the control sessions and enclaves, which can be determined by firewall limitations and access-rules in regions where client devices 202 are located.

When a client device 202 is added to the system (e.g., via management API), some of the policies applicable to a client device 202 can be discovered during client installation:

1. The client type to be supported—if the client device 202 is managed/unmanaged and the OS platform it runs on.
2. Firewall, NAT, and Maximum Transmission Unit (MTU) restrictions, if any, in the client device's 202 path of connectivity to the Internet that determine the port that can be used on the client device 202.
3. Network bandwidth available to the client device 202.

The client devices 202 can run on Windows, Linux, or Android-based end-points. Client devices 202 can be user-managed (human interfacing with a machine) or unmanaged (ex: a server/service or IoT device). A client device 202 is added to a secure communication platform 200 through the management API. When a client device 202 is added to the secure communication platform 200, a unique set of credentials are provided for installation on the client device 202, along with the client software. The credentials allow the secure communication platform 200 to identify the client device 202 when it first registers. The credentials are unique to the client device 202 and cannot be re-used on any other end-point, making it impossible for an end-point to be spoofed. The client device 202 creates a virtual network adapter, and the client software encrypts all traffic routed through the virtual network adapter while all traffic coming in through the adapter is decrypted by the client software.

The client device 202 registers with the management service (via the secure communication platform 200) the very first time with its one-time registration credentials and using the Uniform Resource Locator/Internet Protocol (URL/IP) address provided as part of its registration package. As part of registration, the client device 202 receives a new set of credentials that it uses to log in/sign in to the system. Once signed in, the client device 202 has a control session with the management service. It is free to accept enclaves from peer client devices 202 in its roster or initiate connections to any of the peer client devices 202 on its roster. The client device 202 uses the control session to request the management service to set up a new enclave, and receives notifications about an enclave request from a peer client device 202 on the control session. The control session is kept alive by periodic status updates.

When a client device 202 requests an enclave to be created with a peer client device 202, the secure communication platform 200 checks if it is allowed, and, if so, provides the routable IP address of each peer client device 202 to the other and new certificates to each end-points. The client devices 202 use these new certificates to establish a new IPsec session between themselves. Since the private keys corresponding to the new certificates are known only to the client devices 202, all traffic between them is visible to only the two peer client devices 202 and none other.

Client devices 202 are deployed by installing a client application along with a unique client package that holds credentials and other installation related details unique to each client device 202. The client-package is generated by means of invoking a management API after adding a client to the management service. The actual deployments can be done in several ways, including but not limited to:

1. Manual installation on client device 202 using a Universal Serial Bus (USB) with client application and client-package.
2. Installation from the app-store (in case of Android or Windows).
3. A one-time use web-link provided to the users with a unique password via an out-of-band mechanism (such as email). The web-link will allow the user to download the client application and/or the client package after entering a provided passcode for identity-validation.
4. Installing and registering a client device 202 through calls into the client management API.

Once deployed, the client devices 202 are registered with their management service as part of installation. Thereafter, depending on the type of client device 202, the client device 202 may stay logged in and auto-accept connection requests from peer client devices 202, auto-connect to peer client devices 202 in its group, or connect to peer client devices 202 and accept connection requests manually as needed.

When a client device 202 needs to be removed from the system, an administrator marks it as disabled for the system. Then that client device's 202 current certificates are marked as disabled. This action prevents the agent device 402 from establishing any new IPSec sessions to communicate with the backend. Any existing connections are terminated and all enclave sessions with peer client devices 202 are terminated by forcing them to terminate their respective enclave-sessions.

The following is an exemplary agent device 402 lifecycle process.

Provisioning of an Agent

When a user is added to the agent device 402, a client package is generated that contains cryptographic material and other information that will allow the client to register. This package is protected with a secret user-specific passphrase. The agent software installed on each client allows connecting to multiple network domains to be operated on the same device by creating separate profiles for each domain. Each domain can use a pool of private network IP addresses that are assigned to each registered agent device 402. The installation package includes:
1. Username—corresponding to Username+domain+platform (unique across the installation).
2. SPA 412 private key for registration.
3. One-time-use X509 registration certificate and RSA-2048 private key (generated by the cloud service).
4. Domain.
5. Auto-registration option (yes/no).
6. Cipher suites allowed.
7. Backend IP address(es) and SPA 412 transport protocol and port.
8. A timestamp.
9. A digital signature.

When a user/device is added, the management service stores a copy of the client device's 202 SPA 412 registration public key, a one-time-use public key, and a certificate serial number in the user database 400 for the next login session's validation.

Before registration commences, if the client device 202 sends an SPA 412 message to the cloud service, the SPA 412 searches its cached SPA 412 public keys to identify the one that validates its signature and then installs a firewall rule for the registration. If the SPA 412 operation fails to open the firewall for this client device 202, it pauses and retries until the SPA 412 is successful. The client device 202 can be identified by the source IP address in the SPA 412 message packet.

Client Registration Process

The agent device 402 performs the following:
1. Sends a SPA 412 message, if it is SPA 412-enabled.
2. Creates an IPSec tunnel to the management service and authenticates itself with its pre-assigned one-time-use certificate.
3. It dictates its allowed cipher suites and does not proceed with registration if none are acceptable.
4. It creates key pairs for IPSec and SPA 412 (if enabled) for its next login to the backend.
5. It sends the following information to the management service:
    a. The version number.
    b. Salted and hashed user password.
    c. Domain identity.
    d. The SPA 412 public key (if enabled) to be used for the next login.
    e. A CSR for an agent certificate for the next login session.

The management service performs the following:
1. Receives an incoming IPsec connection from the client device 202, validates the client certificate, and checks its revocation status (e.g., using online Certificate Status Protocol (OCSP)).
2. Validates that the username, device, and control serial number from the certificate matches the certificate serial number stored for the client device 202 in the user database 400.
3. Stores the client information in the user database 400.
4. Passes the CSR message to the CMS 408 for signature, by an appropriate intermediate CA. This ephemeral certificate is used for the next login session.

The agent device 402 receives the ephemeral certificate, the SPA 412 port number, and the backend IP addresses for its next login. The agent device 402 is now fully registered. The cloud service revokes the one-time-use certificate and closes the IPSec connection.

Client Login Process

The agent device 402 creates and transmits the SPA 412 message to open the firewall if SPA 412 is enabled. It uses its ephemeral login certificate to create an IPSec connection to the cloud service. After the IPSec connection is available, the agent device 402 logs in using the client device's 202 password and sends:
1. The version number.
2. Login username (including device and domain).
3. CSR with a signature to generate an ephemeral certificate for the next login.
4. SPA 412 public key for the next login, if SPA 412 is enabled.

The management service:
1. Verifies that the Client Certificate is valid and not revoked (e.g, using OCSP).
2. Verifies that the username and serial number from the ephemeral certificate matches information in the client/user database 400.
3. Validates the password as a second factor of authentication.
4. Stores the login SPA 412 public key for next login (if enabled for SPA 412).
5. Generates a new certification and updates the new control serial number in user database 400 for client device 202.

The agent device 402 receives:
1. The ephemeral certificate for its next login session.
2. Session-specific policies/settings including the-enabled applications and the-enabled destinations.
3. A list of peers for its group.

The agent device 402 is now logged in with the management service, and available to initiate or receive enclaves.

Client Enclave Request

The agent device 402 generates an enclave request in one of three ways:
  When the agent device 402 explicitly requests to set up an enclave with a peer (managed client); or
  Automatically based on client device 202 settings (auto-enclave option/unmanaged client); or
  Enclave-on-demand triggered by traffic from the-enabled application.

The client device 202 enclave is established with an exchange between the client device 202 and the management service, which involves the following:
1. The agent device 402 sends a request to the backend in an enclave request with a specific peer or named service.

2. The management service: a.) validates username and session ID; b.) checks if peer is logged in and if the two peers are allowed to form an enclave with each other; c.) generates an enclave ID unique to the enclave; and d.) forwards the enclave request to the peer and the peer accepts the enclave request.
3. The peer: a.) if the peer accepts, it generates a CSR containing the enclave ID as the subject alternative name; b.) accepts the enclave request attaching the CSR in its response.
4. The management service requests the client to generate a CSR passing it the enclave ID.
5. The agent device 402 generates a CSR with the enclave ID as subject alternative name and sends it.
6. The management service: a.) generates new certificates for the client and peer; b.)
sends enclave parameters including the above to both client and peer.

The Peer-to-Peer Enclave

The peer-to-peer enclave is set up by the following:
1. A connection is created with the client IP address using port number specified in enclave parameters over an IPSec tunnel using the enclave certificates.
2. Enclave ID is passed during establishment of IPSec tunnel.
3. Once our enclave is established, the application data is passed within the enclave.
4. Incoming packets received in the enclave on the adapter are decrypted and forwarded back to the enabled application.
5. Each client device 202 sends a periodic enclave status update to the management service.

Enclave Termination

When a client device 202 or its peer device 202 terminate an enclave, the termination is reported back by the client device 202 to the backend by passing the enclave ID. If both client devices 202 fail to report the termination, the backend detects it after an idle timeout in enclave status update and terminates the sessions. Termination of an enclave on the agent involves disconnection of the IPsec session and removal of certificate used for the enclave. Termination on the backend involves updating the enclave status to disconnected and continuing to log out.

Logout

When a client device 202 logs out, the backend marks the client device 202 as unavailable for connections and closes the firewall rule allowing traffic from the client device 202.

It should be noted that the cloud service can generate its own keys or can be configured to use the OEM partner's Key Management System. Generation of certificates for the agent devices 402 can use the OEM customer's CA as root, if provided, and a certificate chain that includes the CA as intermediate CA. If not, the system provides its own root CA. All keys generated by the agent devices 402 can optionally leverage random-number-generator functions, if available on the client device 202. All signing operations inside the agent devices 402 can also optionally leverage Trust Platform Module (TPM) functionality on the client device 202. All keys on the cloud service are generated by using a secure random number generator. The agent device 402 is uniquely identified by its username. The CSR and certificate subject field embed the user name:platform in their common name, e.g., user name::device (ex:Mary:: windows10). IPsec stack used in the agent device 402 supports:
1. Authentication Methods:
    RSA Signatures (2048, 4096 are supported. Custom key sizes also supported).
2. Encryption Algorithms:
    AES (Key sizes 128, 192, 256).
    AES Encryption Modes: GCM, CTR, GMAC, XCBC.
3. Integrity Algorithms: SHA2-256, SHA2-384, SHA2-512.
4. Key Agreement:
    Diffie Hellman (2048, 3072, 4096, 6144, 8192).

Common Library for Microservers

Figure 7:
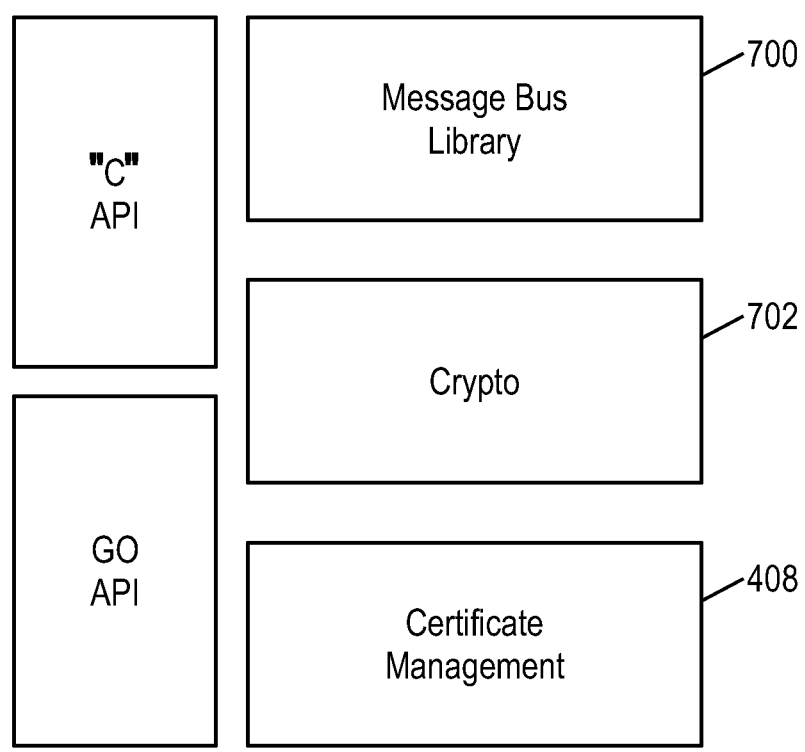
FIG. 7 depicts a high-level view of an exemplary system common library.

FIG. 7 depicts a high-level view of the system common library. The system common library provides software modules that are used by all other microservices 204. The common library includes m(REF BACK TO 700) messaging (e.g., Simple Queue Service (SQS)), certificate management, cryptographic functions, other miscellaneous functions, etc. The common library can be written in Go language. In addition, a "C" language wrapper can be provided so applications written in other languages including C/C++, Java and Python can directly use the library.

The Microservice Messaging Library (MML 700) provides APIs to send and receive messages over AWS's SQS. The MML 700 transparently implements security of messages and handles message encryption and decryption within the library so the application does not need to know anything about how to encrypt and decrypt messages, or even what certificate is being used. In addition, the MML 700 implements a Request/Response paradigm over the microservice messages. The Microservice Message Bus is secured via credentials that are injected into the individual containers.

The Crypto provides encryption/decryption of JavaScript Object Notation (JSON) messages using the standard Json Web Encryption (JWE). It also provides APIs to sign and verify JSON messages using JSON Web Signatures (JWS). JWE provides a standards-based method to encode JSON messages. The messages are encrypted using the public key of the recipient. For encryption, an AES algorithm can be used with a 256-bit key in Galois Counter Mode (GCM). This mode provides combined encryption and message integrity. A RSA Optimal Asymmetric Encryption Padding (RSA-OAEP) mode can be used to encrypt the AES encryption key.

For JWS Signatures, RSA is used. The crypto 702 has support for additional features used with signatures such as timestamps, replay detection, and proof of work. These are handled within the crypto library so the applications do not need to implement these. The window for valid timestamp is configurable (e.g., the default can be 5 minutes). The amount of work needed for proof of work is also configurable, and, by default, it can be disabled (set to 0). With the JWE based encryption/decryption, the crypto library identifies and retrieve the public key used for encryption of message, and if the key is not available, it requests the key from CMS 408. The CMS microservice retrieves the key from Vault 404. It also identifies and retrieves the private key used for decryption of message.

The Certificate Management 408 implements automated certificate management. Certificates are automatically retrieved from the Vault database 406, as needed. When a microservice 204 needs to send a message to another microservice 204, it needs to encrypt the message. Encryption requires the certificate of the recipient of the message. This certificate is obtained from Vault 404 by sending a request to CMS 408. The following sequence of operations are performed by the common library during initialization when the service is launched.
    1. The certificate and private key for the service are loaded from the local file system, if these exist. The filenames are based on the configured base directory and the configured service name. The names are derived as follows:

Certificate: BASEDIR/ca/certs/SERVICENAME-cert.pem

Private Key: BASEDIR/ca/private/SERVICENAME-privkey.pem

2. The certificate for CMS 408 is loaded. This is needed to retrieve certificates for other microservices 204 from CMS 408.
3. If the certificate or private key is not found in step 1, then a new private/public key pair is generated and a CSR message is generated. The CSR is sent to CMS 408 to get the certificate for the service. This certificate is saved to local file system so it is available for future use.
4. If the certificate and private key is found in step 1, then its expiration date is checked. If the certificate has expired, it is not used and step 3 is performed to generate a new certificate.
5. The certificate and private key are kept cached in memory and also saved to disk for future use.
6. When a service needs to communicate with another service, it looks up the certificate for the recipient service. If it exists in cached memory, it is used unless it has expired. If the certificate does not exist or has expired, then the certificate is retrieved by sending a GetCert message to CMS 408.

Figure 8:
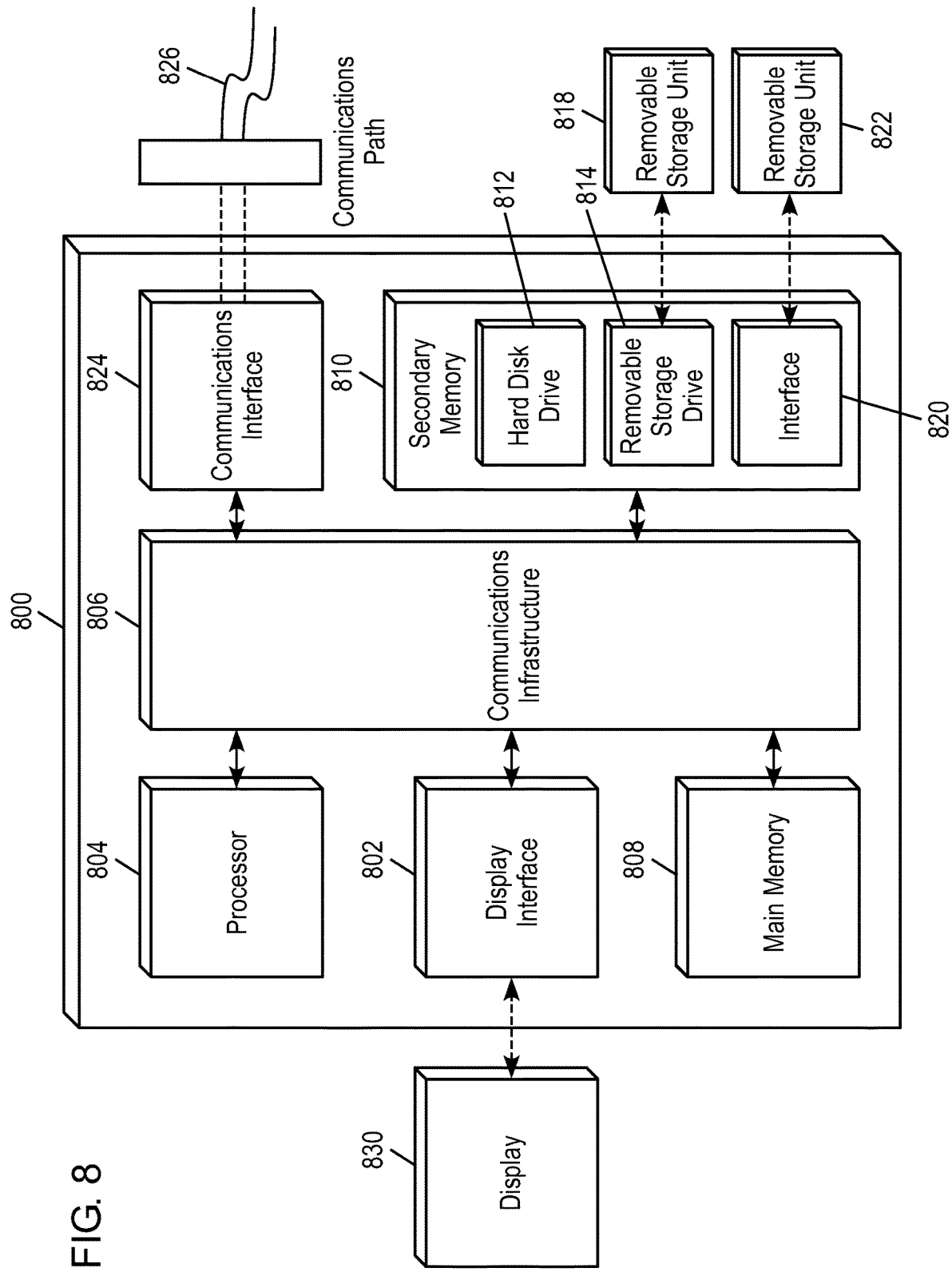
FIG. 8 is an illustration of exemplary hardware architecture for an embodiment of a communication device.

FIG. 8 illustrates a representative computer system 800 in which embodiments of the distributed architecture of the present disclosure, or portions thereof, may be implemented as computer-readable code. For example, the client devices, communication devices, servers, routers, services, and endpoints disclosed herein may be implemented in whole or in part by a computer system 800 using hardware, software, firmware, non-transitory computer readable media having instructions stored thereon, or a combination thereof and may be implemented in one or more computer systems or other processing systems. Hardware, software executed in a processor, or any combination thereof may embody modules and components used to implement the methods and steps of the present disclosure.

As previously noted, the distributed architecture of the present disclosure can live on a cloud, in a data center, on a virtual machine, or any combination thereof, and even can be used between micro services as discussed later in this disclosure. As Internet use has become more popular, "cloud computing" has become more predominant. Cloud computing may be used as an alternative to having local servers or personal devices handling users' applications. In general, cloud computing may indicate that function or storage comes from "the cloud". The cloud is often understood to mean a public network, possibly based on TCP/IP networks, specifically often assumed to be the Internet, so that function within the environment does not come from a specific identifiable device. The architecture behind cloud computing may include a network of "cloud servers" interconnected as if in a grid running in parallel, sometimes using techniques of virtualization, to maximize computing power per computer and/or server. In general, cloud computing may represent a subset of grid computing that may include utility computing and other approaches to the use of shared computing resource.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this representative computer system 800. After reading this description, it will become apparent to a person skilled in the relevant art how to implement the present disclosure using other computer systems and/or computer architectures.

Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a SQL database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a Personal Computer Memory Card International Association (PCMCIA) slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., Dynamic Random Access Memory (DRAM), etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods as discussed herein. Accordingly, such computer programs may represent controllers of the computer system 800. Where the present disclosure is implemented using software executed on hardware, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software executed on hardware, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible considering the above teachings of the disclosure. The disclosed examples and embodiments are presented for purposes of illustration only. Other alternate embodiments may include some or all of the features disclosed herein. Therefore, it is the intent to cover all such modifications and alternate embodiments, which is to be given the full breadth thereof.

It should be understood that modifications to the embodiments disclosed herein can be made to meet a particular set of design criteria. Therefore, while certain exemplary embodiments of the device and methods of using and making the same disclosed herein have been discussed and illustrated, it is to be distinctly understood that the disclosure is not limited thereto but may be otherwise variously embodied and practiced within the scope of the following claims.

What is claimed is:

1. A method of providing secure communication between client devices, the method comprising:
receiving a request, at a processing server of a secure communication platform, from a first client device to communicate with a second client device;
determining, by the processing server of the secure communication platform, that the first client device is permitted to communicate with the second client device;

in response to determining that the first client device is permitted to communicate with the second client device:
  generating, by the processing server of the secure communication platform, a one-time use ephemeral key;
  transmitting, by the processing server of the secure communication platform, the generated one-time use ephemeral key to both the first client device and the second client device;
  establishing, by the processing server of the secure communication platform, a peer-to-peer secure enclave communication session directly between the first client device and the second client device, wherein communications between the first client device and the second client device are encrypted and decrypted using the one-time use ephemeral key; and
  destroying, by the processing server of the secure communication platform, the one-time use ephemeral key upon termination of the peer-to-peer secure enclave communication session between the first client device and the second client device.

2. The method of claim 1, further comprising generating, by the secure communication platform, a new one-time use ephemeral key for each subsequent secure communication session between the first and second client devices.

3. The method of claim 1, wherein the one-time use ephemeral key comprises a public-private keypair.

4. The method of claim 1, further comprising:
  receiving, by the secure communication platform, control session information from the first and second client devices; and
  determining, by the secure communication platform, termination of the peer-to-peer secure enclave communication session using the received control session information.

5. The method of claim 4, further comprising ceasing, by the secure communication platform, all information traffic between the first client device and the second client device when termination of the peer-to-peer secure enclave communication session is determined.

6. The method of claim 1, further comprising denying, by the secure communication platform, the request by the first client device if it is determined that communication is not permitted.

7. The method of claim 1, further comprising removing the secure communication platform from the peer-to-peer secure enclave communication session so that the peer-to-peer secure enclave communication session is directly between the first and second client devices.

8. The method of claim 1, further comprising establishing a management infrastructure via control of the secure communication platform, the management infrastructure being deployed as a Virtual Private Cloud.

9. The method of claim 8, further comprising providing on-demand elastic scalability via a Docker-based microservices architecture.

10. The method of claim 1, verifying authenticity of at least one of the first client device and the second client device via a Single Packet Authorization security layer.

11. A system for providing secure communication between client devices, comprising:
  a secure communication platform including a hardware processing server configured to:
    receive a request from the first client device to communicate with the second client device;
    determine whether the first client device is permitted to communicate with the second client device;
    in response to determining that the first client device is permitted to communicate with the second client device:
      generate a one-time use ephemeral key;
      transmit the generated one-time use ephemeral key to both the first client device and the second client device;
      establish a peer-to-peer secure enclave communication session directly between the first client device and the second client device, wherein communications between the first client device and the second client device are encrypted and decrypted using the one-time use ephemeral key; and
      destroy the one-time use ephemeral key upon termination of the peer-to-peer secure enclave communication session between the first client device and the second client device.

12. The system of claim 11, wherein the hardware processing server is further configured to generate a new one-time use ephemeral key for each subsequent secure communication session between the first and second client devices.

13. The system of claim 11, wherein the one-time use ephemeral key comprises a public-private keypair.

14. The system of claim 11, wherein the hardware processing server is further configured to:
  receive control session information from the first and second client devices; and
  determine termination of the peer-to-peer secure enclave communication session using the received control session information.

15. The system of claim 14, wherein the hardware processing server is further configured to cease all information traffic between the first client device and the second client device when termination of the peer-to-peer secure enclave communication session is determined.

16. The system of claim 11, wherein the hardware processing server is further configured to deny the request by the first client device if it is determined that communication is not permitted.

17. The system of claim 11, wherein the hardware processing server is further configured to remove the secure communication platform from the peer-to-peer secure enclave communication session so that the peer-to-peer secure enclave communication session is directly between the first and second client devices.

18. The system of claim 11, wherein the secure communication platform is deployed as a Virtual Private Cloud.

19. The system of claim 18, wherein the Virtual Private Cloud comprises a Docker-based microservices architecture.

20. The system of claim 11, further comprising a Single Packet Authorization security layer configured to verify authenticity of at least one of the first client device and the second client device.

21. A method of providing secure communication between client devices, the method comprising:
  receiving a request, at a secure communication platform, from a first client device to communicate with a second client device;
  determining, by the secure communication platform, whether the first client device is permitted to communicate with the second client device;
  if communication is permitted:
    generating, by the secure communication platform, a one-time use ephemeral key; and transmitting, by the secure communication platform, the generated one-time use ephemeral key to the first and second client devices;
establishing, by the secure communication platform, a secure communication session between the first and second client devices, wherein communications between the first and second client devices are encrypted and decrypted using the one-time use ephemeral key;
receiving, by the secure communication platform, control session information from the first and second client devices; and
determining, by the secure communication platform, termination of the secure communication session using the received control session information;
destroying, by the secure communication platform, the one-time use ephemeral key upon termination of the secure communication session between the first and second client devices.

\* \* \* \* \*